United States Patent
Su

(10) Patent No.: US 6,463,624 B1
(45) Date of Patent: Oct. 15, 2002

(54) JOINT STRUCTURE OF A WHEEL BEARING

(76) Inventor: Chi-Hsiang Su, No. 41, Chi Hsien Rd., Sanchung City, Taipei Hsien (TW)

( * ) Notice: Subject to any disclaimer, the term of this patent is extended or adjusted under 35 U.S.C. 154(b) by 0 days.

(21) Appl. No.: 09/850,087

(22) Filed: May 8, 2001

(51) Int. Cl.$^7$ .............................................. B60B 33/00
(52) U.S. Cl. ............................... 16/20; 16/31 A; 16/39; 403/278
(58) Field of Search ................................ 16/20, 45, 38, 16/39, 31 R, 31 A; 384/537; 403/270, 335, 13, 14

(56) References Cited

U.S. PATENT DOCUMENTS

| | | | | |
|---|---|---|---|---|
| 501,719 | A | * 7/1893 | Hoffmann | 16/45 |
| 1,620,658 | A | * 3/1927 | Herold | 16/39 |
| 1,656,512 | A | * 1/1928 | Diss et al. | 16/39 |
| 1,710,105 | A | * 4/1929 | Noelting | 16/39 |
| 1,848,348 | A | * 3/1932 | Jarvis | 16/39 |
| 2,194,817 | A | * 3/1940 | Bolu | 384/537 |
| 3,483,888 | A | * 12/1969 | Wurzel | 137/539 |
| 4,364,615 | A | * 12/1982 | Euler | 267/159 |
| 4,831,921 | A | * 5/1989 | Potter | 384/539 |
| 5,007,746 | A | * 4/1991 | Matzelle et al. | 384/420 |
| 6,270,260 | B1 | * 8/2001 | Hale | 384/537 |
| 6,287,013 | B1 | * 9/2001 | Loncar et al. | 384/510 |
| 6,318,900 | B1 | * 11/2001 | Bere et al. | 384/535 |

FOREIGN PATENT DOCUMENTS

| | | | |
|---|---|---|---|
| JP | 60-135304 | * | 7/1985 |
| JP | 5-248444 | * | 9/1993 |
| WO | 0618088 | * | 10/1994 |

* cited by examiner

Primary Examiner—Thomas B. Will
Assistant Examiner—Thomas A. Beach
(74) Attorney, Agent, or Firm—Rosenberg, Klein & Lee

(57) ABSTRACT

A joint structure of a wheel bearing comprises a bearing cover and a pivotal casing. The bearing cover has an outer edge being installed with a plurality of upper sheets which expand outwards; and between two upper sheets are formed with a downward extending lower sheet. The pivotal casing has a top being formed with a yoke; and the yoke is installed with a through hole with respect to the lower sheet. The lower sheet passes through the respective through hole. Thereby, the lower sheet penetrates through the respective through hole and the bottom of the upper sheet resists against the top of the yoke, then the lower sheet bends outwards to press the bottom of the yoke. Therefore, the bearing cover is steadily fixed to the yoke of the pivotal casing. No extra welding is necessary for enhancing the structure.

2 Claims, 5 Drawing Sheets

JOINT STRUCTURE OF A WHEEL BEARING

FIELD OF THE INVENTION

The present invention relates to a joint structure of a wheel bearing, wherein no relative rotation occurs between the bearing cover and pivotal casing. No extra welding operation is necessary so does the desired object is achieved.

BACKGROUND OF THE INVENTION

Referring to FIG. 1, in the prior art, a bearing 2a is installed to the yoke 30a f the pivotal casing 3a of a wheel. After the bearing cover 1a covers on the bearing 2a, the outer edge 10a at the distal end of the bearing cover 1a passes through the round hole 31a on the yoke 30a so that the outer edge 10a of the bearing cover 1a is bent so as to be buckled to the yoke 30a. Therefore, by the pivotal shaft 4a, the orientation of the wheel pivotally connected to the pivotal casing 3a can be controlled.

However, since the bearing cover 1a and the round hole 31a all have round shapes. Therefore, when the joint 32a of the two are loose, the bearing cover 1a possibly rotates on the yoke 30a so that the orientation of the wheel can not be controlled. Therefore, in the prior art, a welding 33a is necessary to enhance the joint so as to have a preferred joint structure. However, the cost and time are increased.

SUMMARY OF THE INVENTION

To achieve the object, the present invention provides a joint structure of a wheel bearing comprising a bearing cover and a pivotal casing. The bearing cover has an outer edge being installed with a plurality of upper sheets which expand outwards; and between two upper sheets are formed with a downward extending lower sheet. The pivotal casing has a top being formed with a yoke; and the yoke is installed with a through hole with respect to the lower sheet. The lower sheet passes through the respective through hole. Thereby, the lower sheet penetrates through the respective through hole and the bottom of the upper sheet resists against the top of the yoke, then the lower sheet bends outwards to press the bottom of the yoke. Therefore, the bearing cover is steadily fixed to the yoke of the pivotal casing. No extra welding is necessary for enhancing the structure.

The various objects and advantages of the present invention will be more readily understood from the following detailed description when read in conjunction with the appended drawing.

DETAILED DESCRIPTION OF THE PREFERRED EMBODIMENTS

Figure 1:
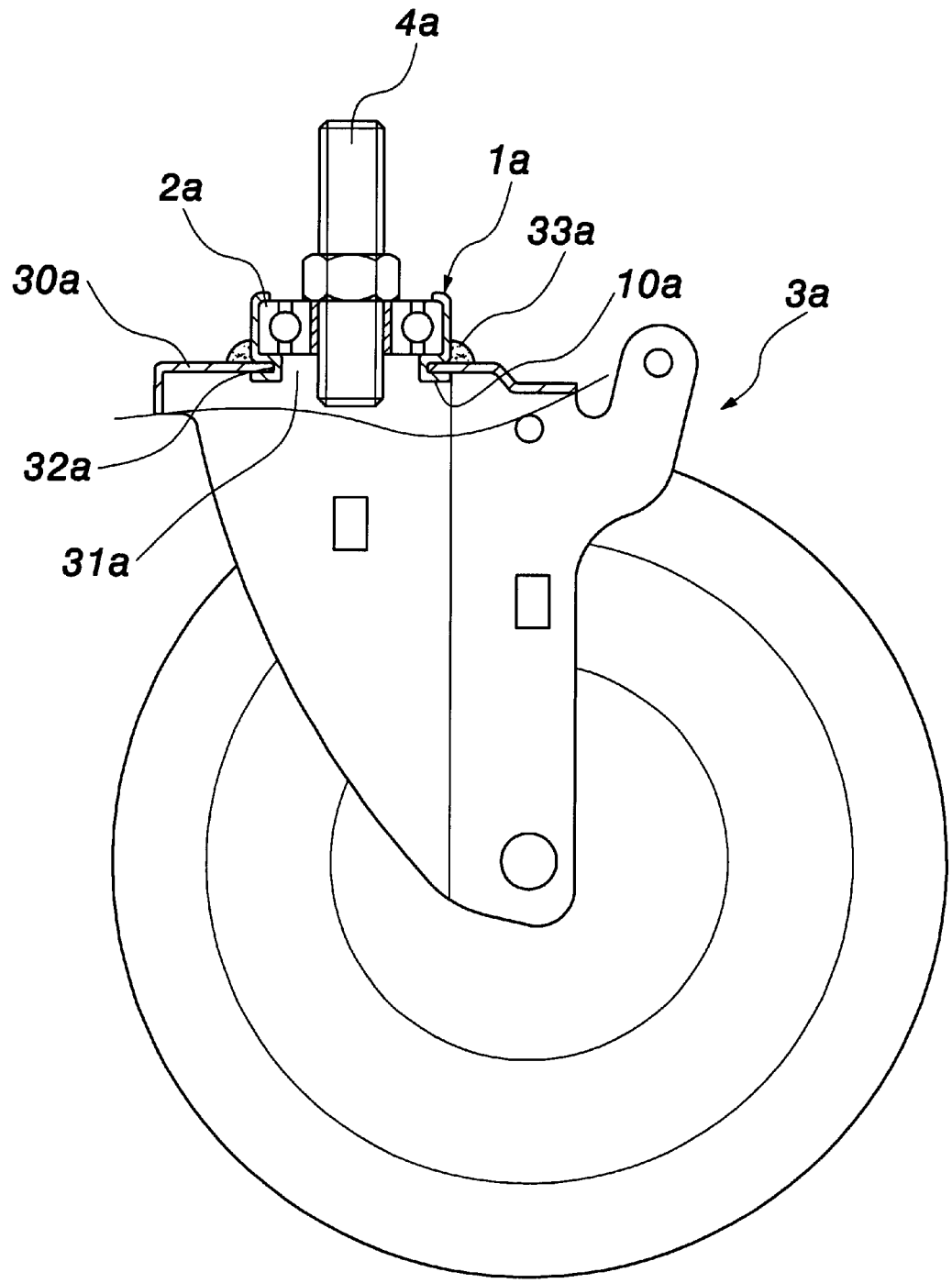
FIG. 1 is a partial cross sectional view of the joint structure of a prior art wheel.
Figure 2:
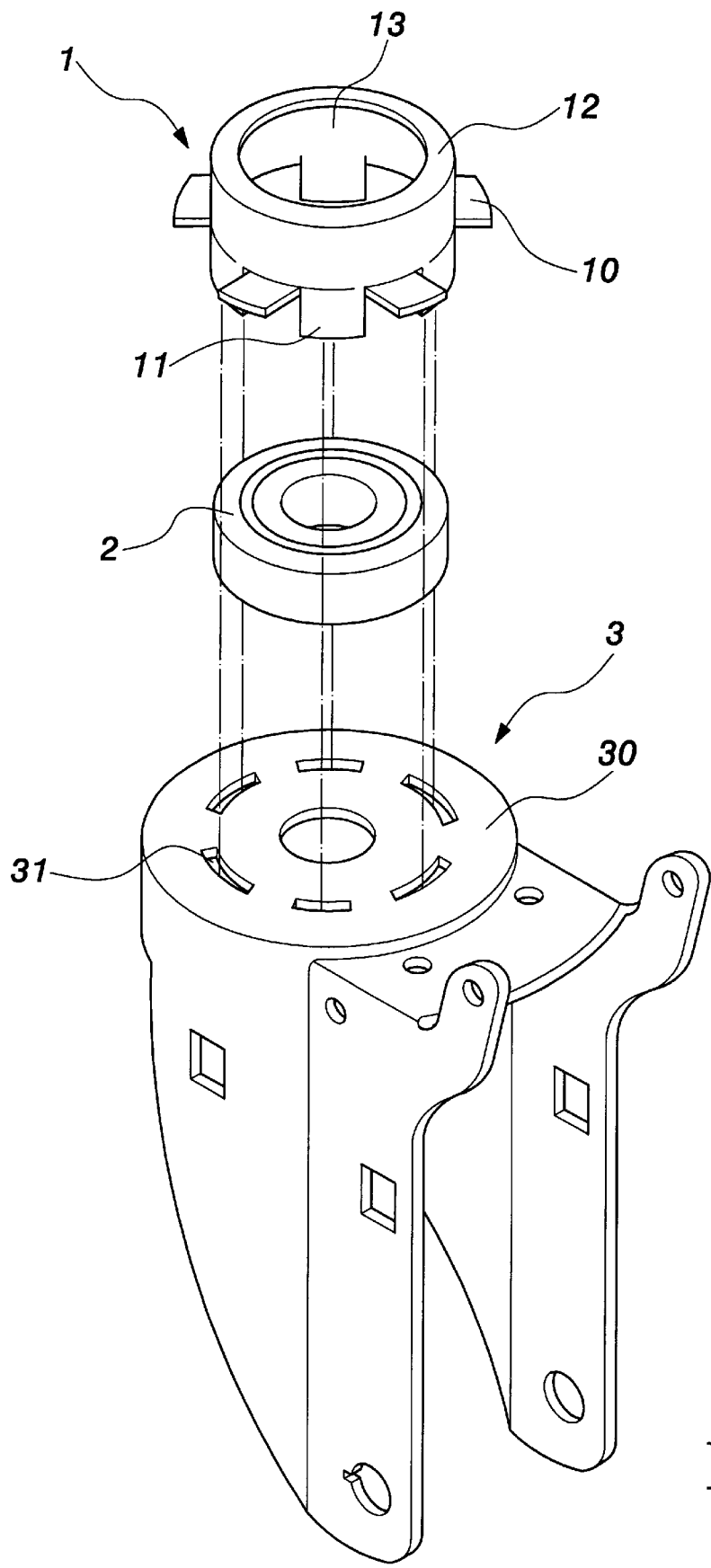
FIG. 2 is an exploded perspective view of the present invention.
Figure 3:
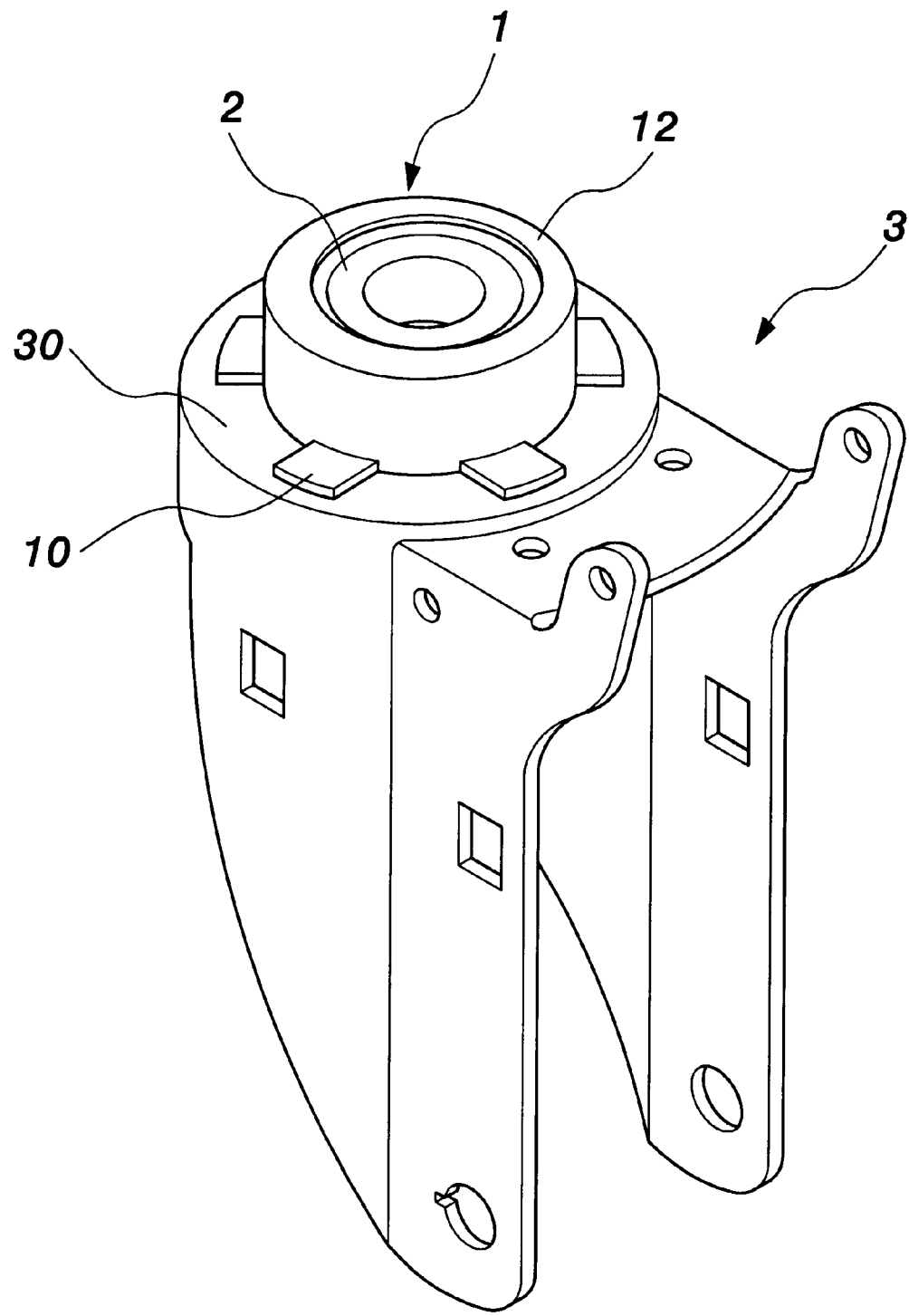
FIG. 3 is an assembled perspective view of the present invention.
Figure 4:
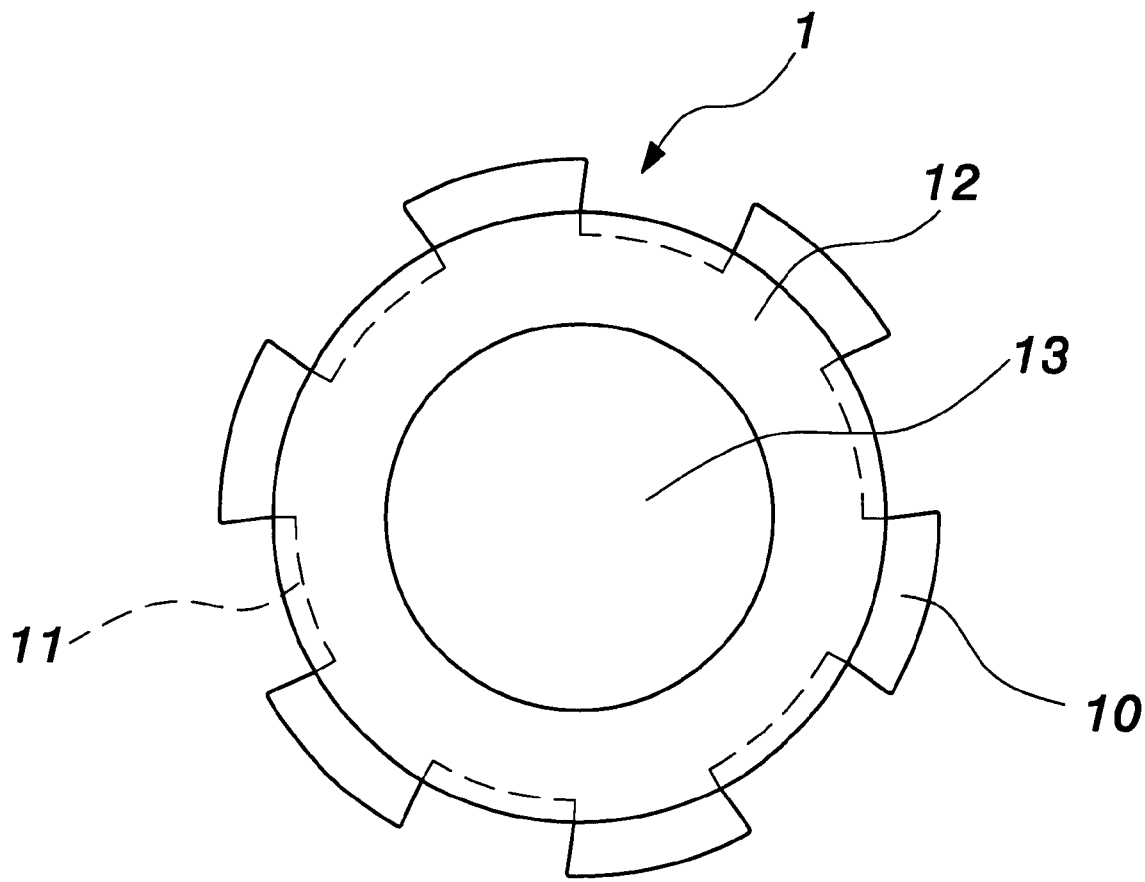
FIG. 4 is an elevation view of the bearing cover according to the present invention.

Referring to FIGS. 2, 3 and 4, the exploded perspective view, assembled perspective view, and elevational view of the bearing cover 1 of the present invention are illustrated. The present invention provides joint structure of the bearing of a wheel. The structure includes a bearing cover 1, and a pivotal casing 3. The bearing cover 1 is a hollow cylinder and is formed with a penetrating opening 13. The opening 13 has a bearing 2. The outer edge of the distal end of the bearing cover 1 is installed with a plurality of upper sheets 10 which expands outwards. Between two upper sheets 10 are formed with a downward extending lower sheet 11.

Figure 5:
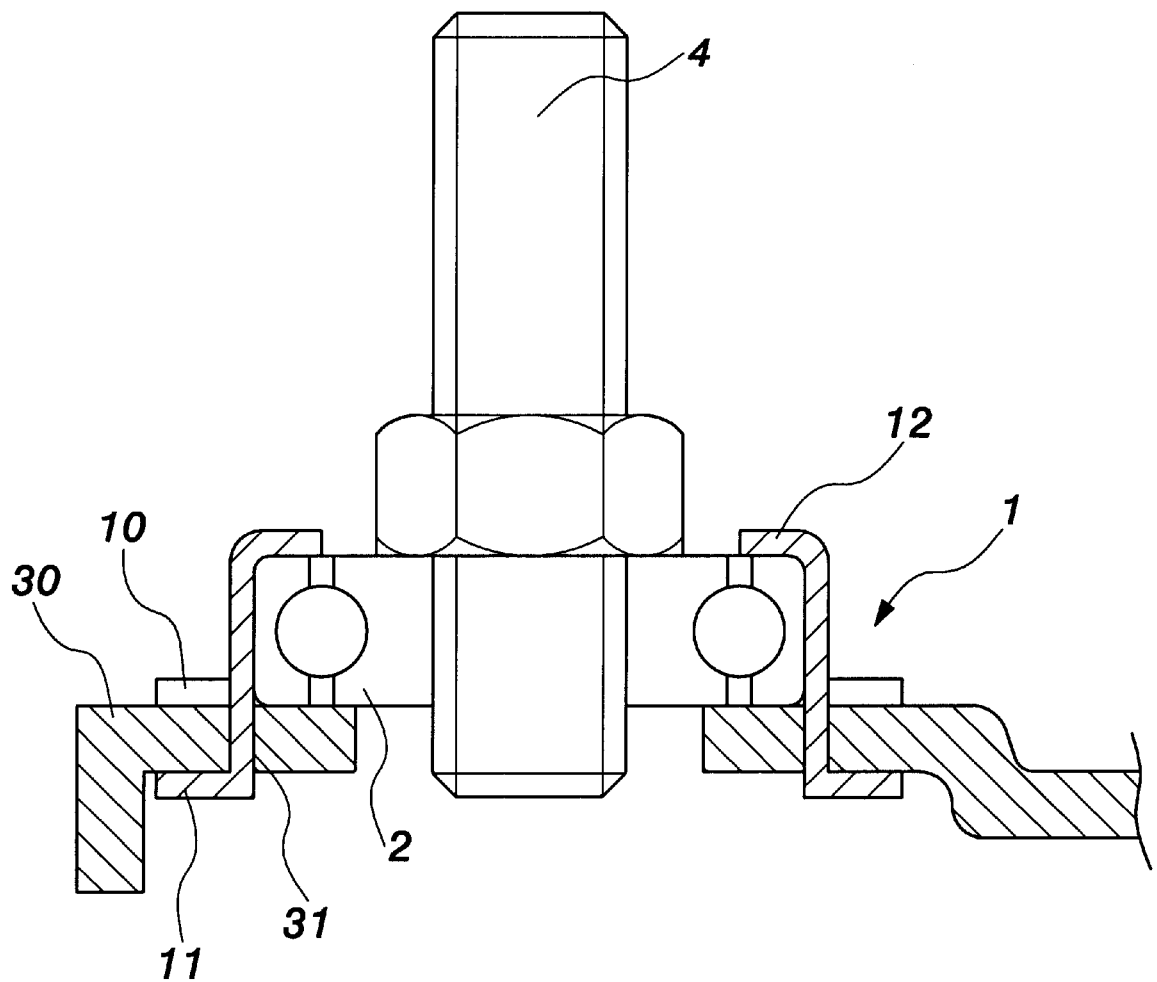
FIG. 5 is a partial cross sectional view showing the application of the present invention.

Besides, referring to FIGS. 2, 3, and 5, the top of the pivotal casing 3 is formed with a yoke 30. The yoke 30 is installed with a through hole 31 with respect to the lower sheet 11. The lower sheet 11 passes through the respective through hole 31. By the lower sheets 11 penetrating through the respective through hole 31 and the bottoms of the upper sheets 10 resisting against the top of the yoke 30 and then bending the lower sheet 11 outwards to press the bottom of the yoke 30, the yoke 30 is clamped between the upper sheets 10 and lower sheets 11 and therefore, the bearing 2 in the bearing cover 1 can be steadily installed in the upper side of the yoke 30 of the pivotal casing 3. Since the lower sheet 11 passes through the respective through hole 31, and then it is bent outwards to resist against the bottom the yoke 30, the bearing cover 1 will not rotate relatively to the pivotal casing 3 or separate from the pivotal casing 3. Therefore, no welding operation is necessary. Thus the time and work are saved so does the cost saved.

Furthermore, referring to FIG. 5, the top of the bearing cover 1 is extended inwards to be formed with an annular thin piece 12. The thin piece 12 encloses tightly the bearing 2 in the bearing cover 1. Therefore, the pivotal casing 3 is prevented from separating from the top of the bearing cover 1 due to an outer force from the bearing 2.

In the joint structure of a wheel bearing according to the present invention, the upper sheets 10 and lower sheets 11 are used to clamp the yoke 30 of the pivotal casing 3 steadily and the lower sheets 11 penetrate through the through holes 31 of the yoke 30. Therefore, no relative rotation occurs between the bearing cover 1 and pivotal casing 3. No extra welding operation is necessary so does the desired object is achieved.

In summary, by the present invention, the defects of the prior art, such as the relative rotation of the bearing cover with respect to the pivotal casing, improper controlling about the orientation of the wheel, welding operation being necessary for enhancing the structure, are improved by the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A joint structure of a wheel bearing comprising:

a bearing cover having an outer edge being installed with a plurality of upper sheets expanding outwards; between two upper sheets being formed with a downward extending lower sheet; and a pivotal casing having an top being formed with a yoke; the yoke being installed with a through hole with respect to the lower sheet; the lower sheet passing through a respective through hole; thereby, the lower sheet penetrating through the respective through hole and a bottom of the upper sheet resisting against the top of the yoke, and then the lower sheet bending outwards to press a bottom of the yoke.

2. The joint structure of a wheel bearing as claimed in claim 1, wherein a top of the bearing cover is inwards extended with an annular thin piece.

* * * * *